US008514563B2

(12) United States Patent
Liang et al.

(10) Patent No.: US 8,514,563 B2
(45) Date of Patent: Aug. 20, 2013

(54) SERIAL ADVANCED TECHNOLOGY ATTACHMENT ASSEMBLY FOR COMPUTER

(75) Inventors: An-Gang Liang, Shenzhen (CN); Hung-Yi Wu, New Taipei (TW)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 160 days.

(21) Appl. No.: 13/280,488

(22) Filed: Oct. 25, 2011

(65) Prior Publication Data

US 2012/0262872 A1 Oct. 18, 2012

(30) Foreign Application Priority Data

Apr. 18, 2011 (CN) .......................... 2011 2 0113289

(51) Int. Cl.
*G06F 1/16* (2006.01)

(52) U.S. Cl.
USPC ................. 361/679.31; 439/607.31; 365/266; 345/212

(58) Field of Classification Search
USPC ................... 439/76.1, 630, 607.31, 660, 680, 439/370; 365/185.03, 185.18, 189.05, 189.011, 365/185.11, 266; 345/173, 174, 158, 629, 345/419, 660, 212; 361/760, 753, 220, 679.32, 361/679.37, 679.58, 679.26, 679.02, 679.3, 361/679.4, 679.22, 679.31
See application file for complete search history.

(56) References Cited

U.S. PATENT DOCUMENTS

| | | | | |
|---|---|---|---|---|
| 7,517,231 | B2 * | 4/2009 | Hiew et al. | 439/76.1 |
| 7,517,252 | B2 * | 4/2009 | Ni et al. | 439/630 |
| 8,310,836 | B2 * | 11/2012 | Schuette | 361/760 |

* cited by examiner

*Primary Examiner* — Hung Duong
(74) *Attorney, Agent, or Firm* — Altis Law Group, Inc.

(57) ABSTRACT

A serial advanced technology attachment assembly includes a solid state drive and a serial advanced technology attachment. The solid state drive extends in a first longitudinal direction. The serial advanced technology attachment includes a first connector and a second connector; the first connector electrically connects the serial advanced technology attachment, the second connector extends in a second longitudinal direction parallel to the first longitudinal direction.

9 Claims, 3 Drawing Sheets

SERIAL ADVANCED TECHNOLOGY ATTACHMENT ASSEMBLY FOR COMPUTER

BACKGROUND

1. Technical Field

This disclosure relates to serial advanced technology attachment assemblies, and in particular, to a serial advanced technology attachment assembly for a computer.

2. Description of Related Art

Serial advanced technology attachment (SATA) includes a connector connecting host bus adapters to mass storage devices such as solid state drives (SSD). Typical computer may use a plurality of SDDs, and each SDD needs a SATA connector to connect to the host bus adapter. However, the connector is perpendicular to the SDD when the SATA is inserted to the SDD. Thus, the connectors may be bent or interfered with each other if the space between the SDDs is small.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary serial advanced technology attachment assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
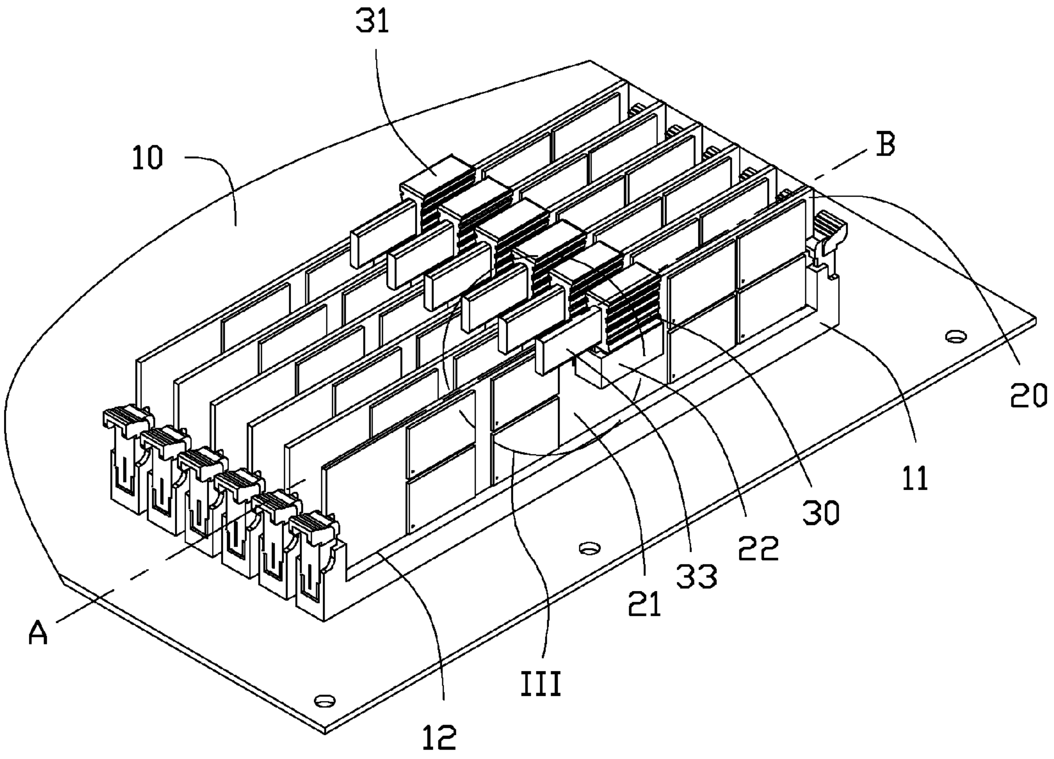
FIG. 1 is a schematic view of a computer with a serial advanced technology attachment assembly according to an exemplary embodiment.
Figure 2:
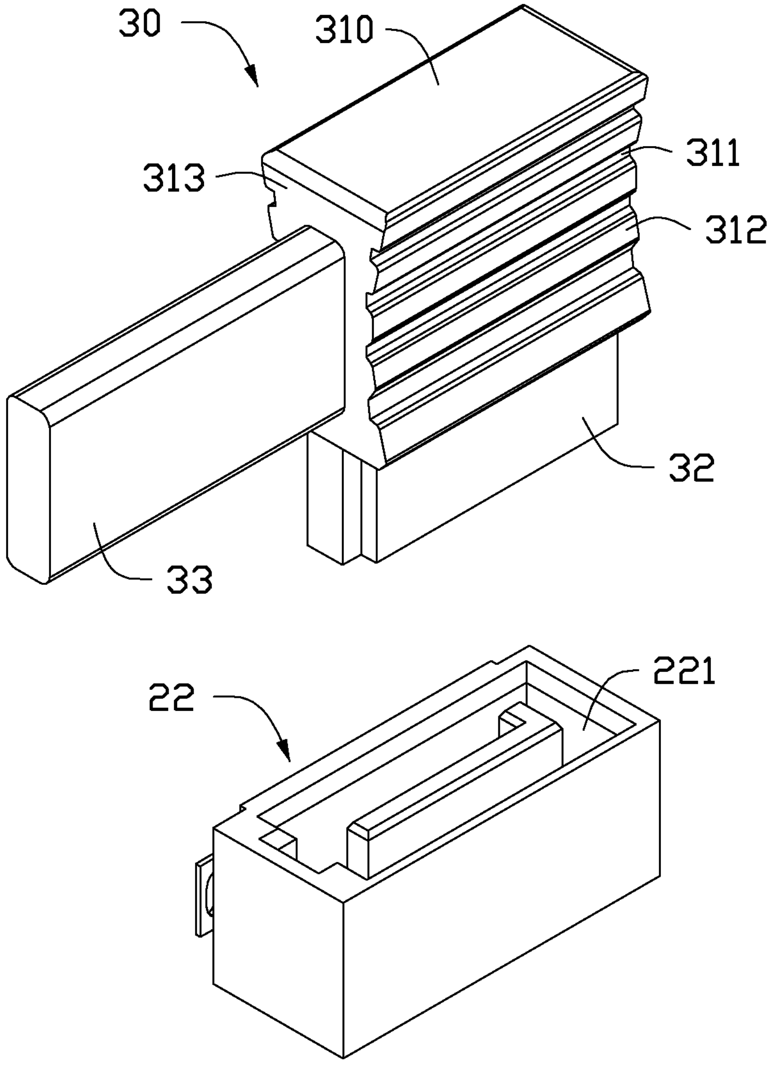
FIG. 2 is an exploded view of the serial advanced technology attachment assembly of FIG. 1.

Referring to FIGS. 1 and 2, an exemplary embodiment of computer (not labeled) includes a main board 10 and a plurality of serial advanced technology attachment assembly (SATA) (not labeled). Each SATA includes a solid state drive (SDD) 20 and a SATA 30. The main board 10 includes a plurality of parallel peripheral component interconnects (PCI) 11. Each PCI 11 defines a slot 12, in which one of the SDDs 20 is inserted.

Figure 3:
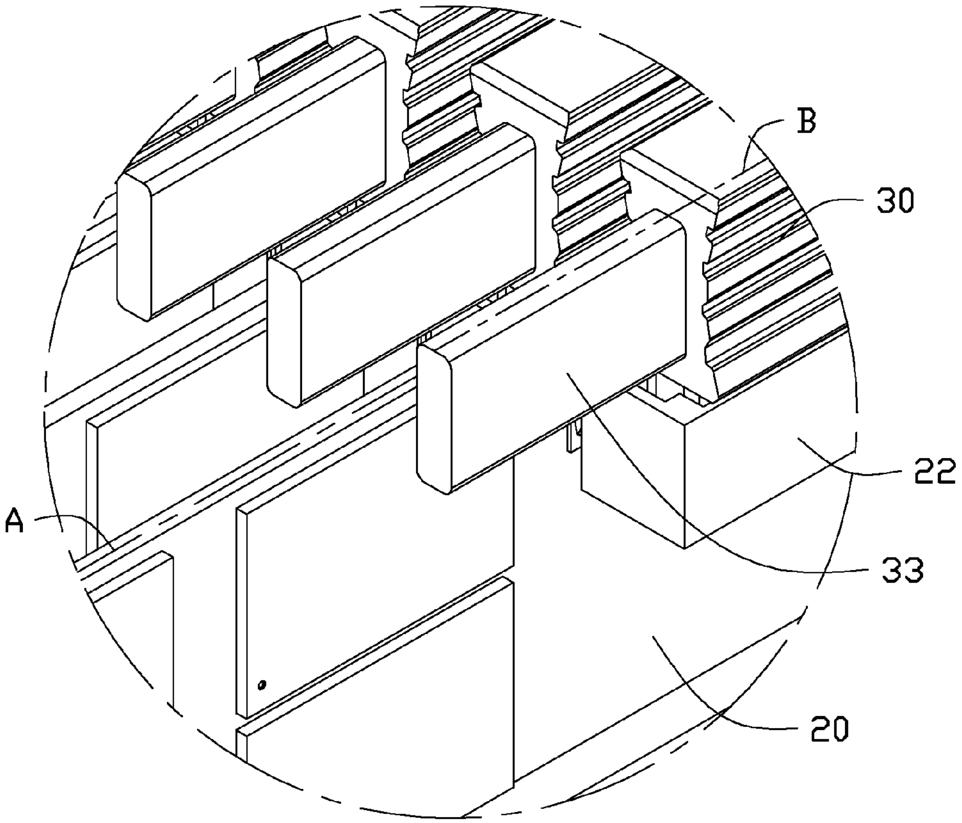
FIG. 3 is a partially enlarged view of the computer of FIG. 1 in a circle portion III.

Referring to FIGS. 2 and 3, each SDD 20 includes a mounting surface 21. Each SDD 20 further includes an adapter 22 located on the mounting surface 21 for electrically connecting the SDDs 20 to the SATAs 30. After the SDDs 20 are inserted in corresponding SATAs 30, each SDD 20 extends in a first longitudinal direction A. Each adapter 22 defines a port 221 connecting to one of the SATAs 30.

Each SATA 30 includes a main body 31, a first connector 32 and a second connector 33. Both the first connector 32 and the second connector 33 are located on the main body 31. Each first connector 32 is inserted in one of the ports 221 so corresponding SATA 30 is electrically connected to corresponding SDD 20. Each second connector 33 is a SATA connector connecting to a host bus adapter (not shown) of the computer. Each second connector 33 protrudes from corresponding main body 31 in a second longitudinal direction B parallel to the first longitudinal direction A after corresponding SATA 30 is connected to corresponding SATA 30. In this exemplary embodiment, each main body 31 may be substantially rectangular, includes two end surfaces 310, two side surfaces 311 and two sidewalls 313. Each first connector 32 is located at one of corresponding end surfaces 310. Each second connector 33 is located at one of corresponding sidewalls 313. Each side surface 311 has a plurality of spaced raised portions facilitating a user gripping the corresponding SATA 30.

In above embodiment, each second connector 33 protrudes from corresponding main body 31 in the second longitudinal direction B parallel to the first longitudinal direction A after corresponding SATA 30 is connected to corresponding SATA 30, which can prevent the second connectors 33 from being bent or interfered with even if the space between the SDDs 20 is small.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A serial advanced technology attachment assembly comprising:

a solid state drive extending in a first longitudinal direction; and a serial advanced technology attachment, wherein the serial advanced technology attachment includes a first connector and a second connector electronically connecting to the first connector; the first connector electrically connects the serial advanced technology attachment with the solid state drive, and the second connector extends in a second longitudinal direction parallel to the first longitudinal direction.

2. The serial advanced technology attachment assembly of claim 1, wherein the solid state drive includes a mounting surface and an adapter located on the mounting surface for electrically connecting the solid state drive to the serial advanced technology attachment.

3. The serial advanced technology attachment assembly of claim 2, wherein the adapter defines a portion, in which the first connector is inserted.

4. The serial advanced technology attachment assembly of claim 1, wherein the serial advanced technology attachment further comprises a plurality of spaced raised portions for facilitating gripping.

5. A computer comprising:

a main board;

a solid state drive located on the main board and extending in a first longitudinal direction; and a serial advanced technology attachment, wherein the serial advanced technology attachment includes a first connector and a second connector; the first connector electrically connects the electrically connected to the serial advanced technology attachment, the second connector extends in a second longitudinal direction parallel to the first longitudinal direction.

6. The computer of claim 1, wherein the solid state drive includes a mounting surface and an adapter located on the mounting surface for electrically connecting the solid state drive to the serial advanced technology attachment.

7. The computer of claim 6, wherein the adapter defines a portion, in which the first connector is inserted.

8. The computer of claim 5, wherein the serial advanced technology attachment further comprises a plurality of spaced raised portions for facilitating gripping.

9. The computer of claim 5, wherein the main board includes a peripheral component interconnects defining a slot, in which the solid state drive is inserted.

* * * * *